(12) United States Patent
Hatta

(10) Patent No.: US 10,693,364 B2
(45) Date of Patent: Jun. 23, 2020

(54) POWER SUPPLY BOARD AND PRINTER

(71) Applicant: Brother Kogyo Kabushiki Kaisha, Nagoya-shi, Aichi-ken (JP)

(72) Inventor: Fumika Hatta, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/362,907

(22) Filed: Mar. 25, 2019

(65) Prior Publication Data
US 2019/0305670 A1 Oct. 3, 2019

(30) Foreign Application Priority Data
Mar. 30, 2018 (JP) ................. 2018-070126

(51) Int. Cl.
| | | |
|---|---|---|
| *B41J 29/393* | (2006.01) | |
| *B41J 2/045* | (2006.01) | |
| *H02M 1/32* | (2007.01) | |
| *H02M 1/088* | (2006.01) | |
| *H02M 3/155* | (2006.01) | |

(52) U.S. Cl.
CPC .......... *H02M 1/32* (2013.01); *B41J 2/04541* (2013.01); *B41J 29/393* (2013.01); *H02M 1/088* (2013.01); *H02M 3/155* (2013.01); *B41J 2029/3932* (2013.01)

(58) Field of Classification Search
CPC .... B41J 2/04541; B41J 29/393; B41J 2/0455; B41J 2/0457; B41J 29/38; H02M 3/155; H02M 1/088; H02M 1/32
USPC .......................................... 347/9–11, 50, 108
See application file for complete search history.

(56) References Cited

U.S. PATENT DOCUMENTS

| | | | | |
|---|---|---|---|---|
| 7,750,512 | B2 * | 7/2010 | Kimura | H02J 1/102 307/140 |
| 7,806,492 | B2 * | 10/2010 | Furukawa | B41J 2/04541 347/5 |
| 8,348,366 | B2 * | 1/2013 | Yamashita | B41J 2/04573 347/10 |
| 10,500,845 | B2 * | 12/2019 | Hatta | B41J 2/04541 |
| 2017/0282547 | A1 | 10/2017 | Hatta | |

FOREIGN PATENT DOCUMENTS

| | | |
|---|---|---|
| JP | 2015-024531 A | 2/2015 |
| JP | 2017-177572 A | 10/2017 |

* cited by examiner

*Primary Examiner* — An H Do
(74) *Attorney, Agent, or Firm* — Banner & Witcoff, Ltd.

(57) ABSTRACT

A power supply board includes: first and second power supply circuits; first and second terminals configured to supply the electric power from the first and second power supply circuits to the head, respectively; a first line connected to an output terminal of the first power supply circuit; a second line connected to an output terminal of the second power supply circuit; and a branched line branched form the first line to be connected to an input terminal of the second power supply circuit and supplies the electric power from the first power supply circuit to the second power supply circuit. An input power source is connected to an input terminal of the first power supply circuit.

15 Claims, 10 Drawing Sheets

POWER SUPPLY BOARD AND PRINTER

CROSS REFERENCE TO RELATED APPLICATION

The present application claims priority from Japanese Patent Application No. 2018-070126 filed on Mar. 30, 2018, the disclosure of which is incorporated herein by reference in its entirety.

BACKGROUND

Field of the Invention

The present disclosure relates to a power supply board configured to supply electric power to a head configured to jet liquid and a printer including the power supply board.

Description of the Related Art

There is conventionally suggested a head module including six power supply circuits. The head module includes driving elements corresponding to nozzles and liquid is jetted from the nozzles by driving the driving elements. The head module includes a control circuit. The control circuit selects any one of the six power supply circuits to drive each driving element.

SUMMARY

For example, the six power supply circuits are connected in parallel to an input power source. When a first power supply circuit is activated and then a second power supply circuit is activated after the elapse of a predefined time, the voltage in an input side of the first power supply circuit may fall and backflow of current through the first power supply circuit may be caused. This may break or damage the first power supply circuit. Further, when the second power supply circuit is used to start driving of each driving element, the voltage in the input side of the first power supply circuit may fall and backflow of current through the first power supply circuit may be caused. This may break or damage the first power supply circuit.

The present disclosure is made in view of the above circumstances, and an object of the present disclosure is to provide a power supply board that is capable of preventing damage in a power supply circuit due to backflow of current and a printer including the power supply board.

The power supply board according to the present disclosure is a power supply board configured to supply electric power to a head configured to jet liquid, the board including: a first power supply circuit; a second power supply circuit having an output voltage lower than an output voltage of the first power supply circuit; a first terminal connected to the head and configured to supply the electric power from the first power supply circuit to the head; a second terminal connected to the head and configured to supply the electric power from the second power supply circuit to the head; a first line connected to an output terminal of the first power supply circuit and configured to supply the electric power from the first power supply circuit to the first terminal; a second line connected to an output terminal of the second power supply circuit and configured to supply the electric power from the second power supply circuit to the second terminal; and a branched line branched form the first line to be connected to an input terminal of the second power supply circuit and configured to supply the electric power from the first power supply circuit to the second power supply circuit. An input power source is connected to an input terminal of the first power supply circuit.

The power supply board according to the present disclosure is a power supply board configured to supply electric power to a head configured to jet liquid, the board including: a first power supply circuit; a plurality of second power supply circuits each having an output voltage lower than an output voltage of the first power supply circuit; a first terminal connected to the head and configured to supply the electric power from the first power supply circuit to the head; and a plurality of second terminals connected to the head and configured to supply the electric power from the second power supply circuit to the head. An input power source is connected to an input terminal of the first power supply circuit, and input terminals of the second power supply circuits and the first terminal are connected to an output terminal of the first power supply circuit in parallel.

In the power supply board and the printer according to the present disclosure, the input terminal of the second power supply circuit is connected to the output side of the first power supply circuit via the branched line branched from the first line, thus preventing backflow of current through the first power supply circuit.

DESCRIPTION OF THE EMBODIMENTS

Figure 1:
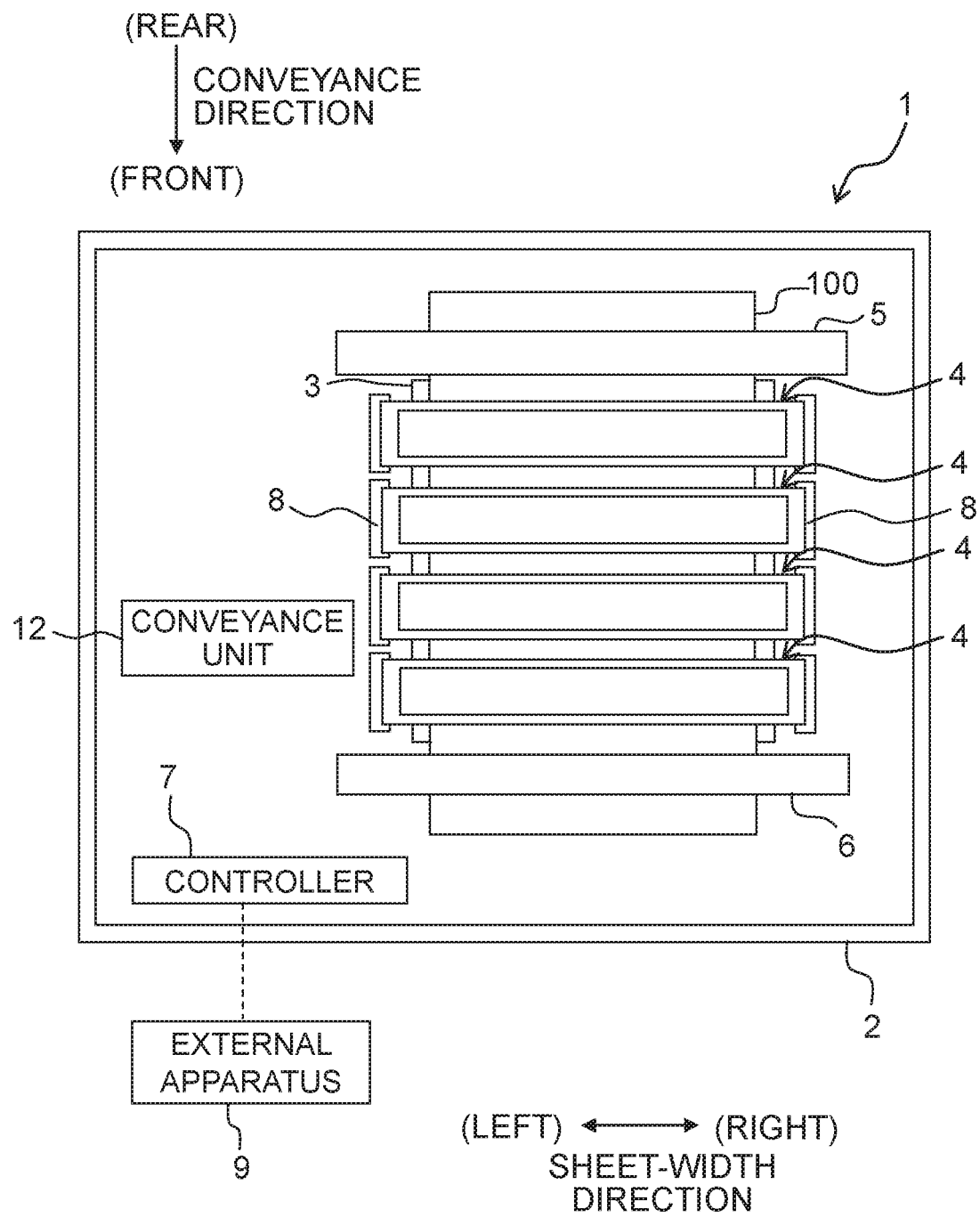
FIG. 1 is a plan view of exemplary main components of a printer.

A printer 1 according to an embodiment of the present disclosure is explained below while referring to FIG. 1. The printer 1 may be an ink-jet printer. In the present specification, front, rear, left, and right sides are defined as depicted in FIG. 1. The printer 1 includes a casing 2.

The casing 2 includes a platen 3, four ink-jet heads 4, conveyance rollers 5 and 6, a controller 7, and the like. The number of ink-jet heads 4 and the number of the conveyance rollers 5 and 6 are not limited to those depicted in FIG. 1.

The casing 2 includes head holding portions 8. The head holding portions 8 are arranged above the platen 3 in a position between the two conveyance rollers 5 and 6. The head holding portions 8 are arranged in a front-rear direction. The head holding portions 8 hold the ink-jet heads 4.

A recording sheet 100 is placed on the platen 3 of the printer 1. The conveyance rollers 5 and 6 are arranged at both ends in the front-rear direction of the platen 3. Rotation of the conveyance rollers 5 and 6 conveys the recording sheet 100 in the front-rear direction (conveyance direction).

The outer shape of each ink-jet head 4 is a substantially rectangle in a planar view. The ink-jet head 4 is disposed such that its short side is along a conveyance direction (front-rear direction) in which the recording sheet 100 is conveyed and its long side is along a direction (left-right direction) orthogonal to the conveyance direction. The ink-jet head 4 is disposed such that a nozzle surface of the ink-jet head 4 faces the platen 3. The four ink-jet heads 4 are arranged in the front-rear direction in a position between the conveyance rollers 5 and 6.

For example, the four ink-jet heads 4 correspond to cyan, magenta, yellow, and black inks, respectively. The printer 1 includes a conveyance unit 12 configured to convey the four ink-jet heads 4. For example, when print processing is completed, the conveyance unit 12 conveys the four ink-jet heads 4 to a predefined position to inhibit inks in the nozzles from drying. A cover is provided in the predefined position to cover the nozzle surface of each ink-jet head 4 conveyed to the predefined position. The conveyance unit 12 is made by using publicly known components, such as arms holding each ink-jet head 4 and a ball screw mechanism configured to move the arms.

The controller 7 includes a first substrate 71 described below. Each ink-jet head 4 includes head units 11 as liquid droplet jetting apparatuses. Each head unit 11 includes a power supply board 50 described below and a flexible circuit board 60 described below. The power supply board 50 is connected to the flexible circuit board 60. For example, the printer 1 may include four ink-jet heads 4 and each ink-jet head 4 may include nine head units 11. In that case, the printer 1 includes 36 pieces of the head unit 11, and thus 36 pieces of the power supply board 50 and 36 pieces of the flexible circuit board 60 connected to those 36 pieces of the power supply board 50 are provided in the printer 1. The first substrate 71 is connected to those 36 pieces of the power supply board 50.

The controller 7 activates a motor (not depicted) and controls operation of the conveyance rollers 5 and 6, thus conveying the recording sheet 100. When a user inputs a printing command to the printer 1 via an external apparatus 9 or an operation unit provided for the printer 1, the controller 7 transmits a signal of the printing command, raster data of an image to be printed, and the like to the power supply board 50. Then, the controller 7 controls the head units 11 of each ink-jet head 4 to jet ink(s) to the recording sheet 100 during conveyance of the recording sheet 100.

The controller 7 interacts or intercommunicates with the external apparatus 9, such as a personal computer. Receiving a command from the external apparatus 9 or the operation unit (not depicted) provided for the printer 1, the controller 7 controls each ink-jet head 4 and operation of and the conveyance rollers 5, 6 in accordance with a program(s) stored in a Read Only Memory (ROM). A Central Processing Unit (CPU) or a Microprocessor Unit (MPU) may be used instead of a Field Programmable Gate Array (FPGA) 711.

In addition to the FPGA 711, the first substrate 71 includes the ROM (not depicted), a Random Access Memory (RAM, not depicted), a non-volatile memory 712, and the like. The non-volatile memory 712 may be an Electrically Erasable Programmable Read-Only Memory (EEPROM), or the like.

Figure 2:
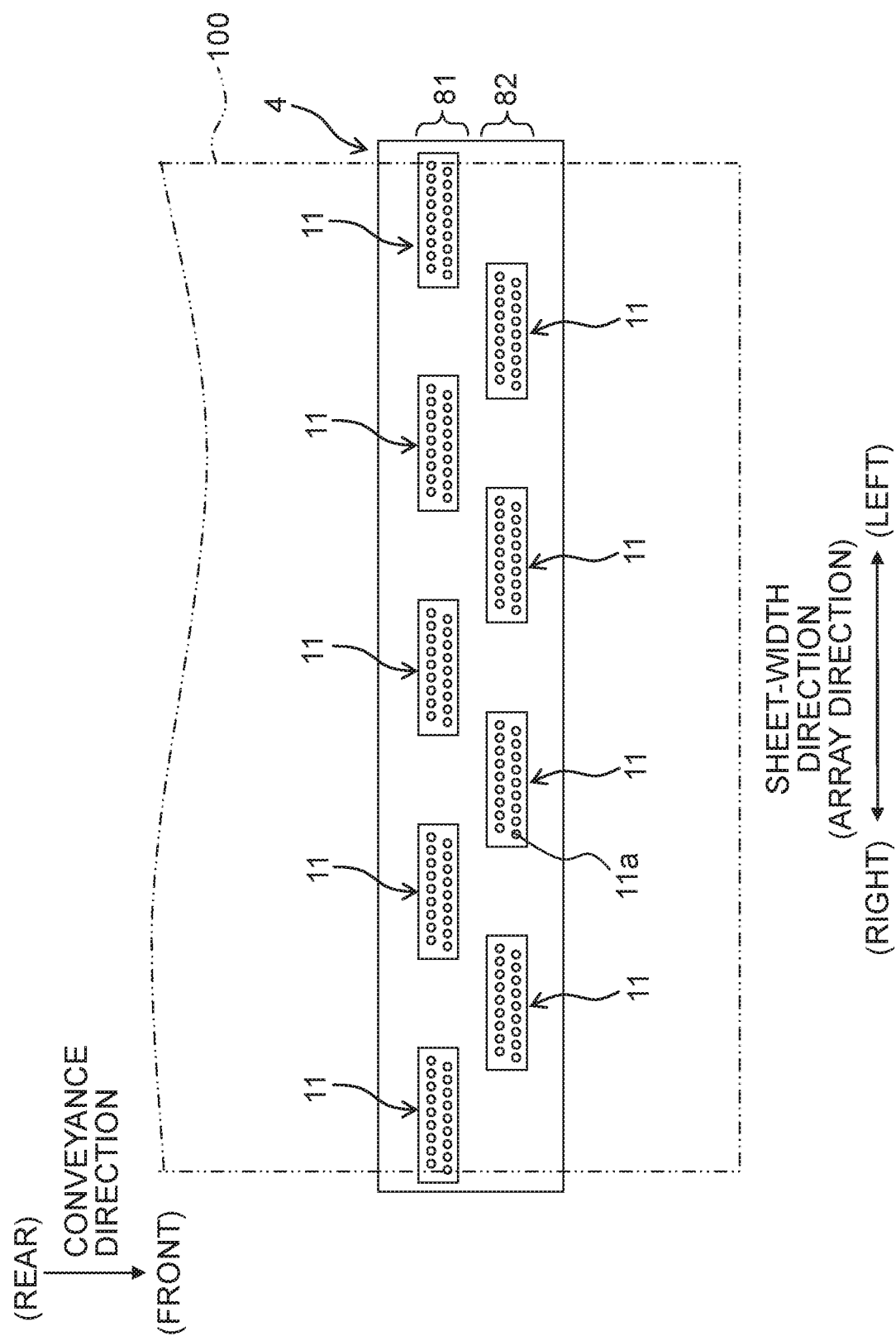
FIG. 2 is a plan view of exemplary main components of an ink-jet head when seen from a nozzle surface side.

As depicted in FIG. 2, the head units 11 are arranged in two rows in the front-rear direction. A front row 82 includes four pieces of the head unit 11 arrayed in the left-right direction. A rear row 81 includes five pieces of the head unit 11 arrayed in the left-right direction. The nozzle surface of each head unit 11 (a lower surface of a nozzle plate) has openings 11a of the nozzles. Each head unit 11 includes as many driving elements 111 (described below) as the openings 11a of the nozzles. The openings 11a are schematically depicted in FIG. 2 for the sake of simplicity, and the actual arrangement and the actual number of openings 11a are different from those depicted in FIG. 2. Although FIG. 2 depicts an exemplary configuration in which the ink-jet head 4 includes nine pieces of the head unit 11, the number of head units 11 is not limited to nine. Each head unit 11 includes the power supply board 50, the flexible circuit board 60, and the like.

Figure 3:
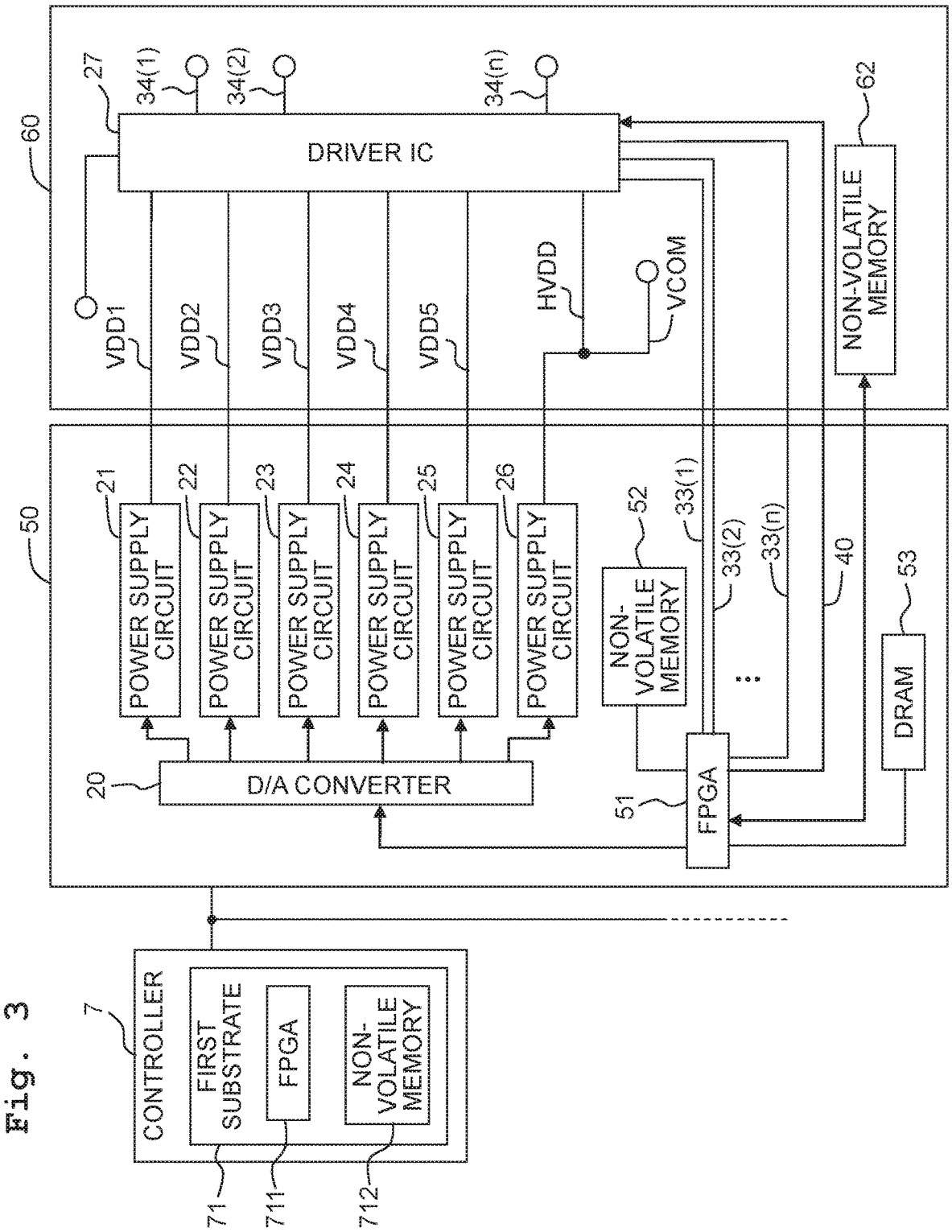
FIG. 3 depicts an exemplary block configuration including a power supply board provided for a head unit and a flexible circuit board connected to the power supply board and provided for the head unit.

FIG. 3 depicts an exemplary block configuration including the power supply board 50 provided for the head unit 11 and the flexible circuit board 60 connected to the power supply board 50 and provided for the head unit 11 according to this embodiment. In FIG. 3, one power supply board 50 and one flexible circuit board 60 are depicted.

The power supply board 50 includes: a FPGA 51 as a controller, a non-volatile memory 52 such as an EEPROM, a DRAM 53 in which raster data from the controller 7 is temporarily stored, a D/A converter 20, a power supply circuit 21, a power supply circuit 22, a power supply circuit 23, a power supply circuit 24, a power supply circuit 25, a power supply circuit 26, and the like. The flexible circuit board 60 includes a non-volatile memory 62 as an EEPROM, a drive IC 27, and the like. A Central Processing Unit (CPU) or a Microprocessor Unit (MPU) may be used instead of the FPGA 51.

The FPGA 51 outputs, to the D/A converter 20, a setting signal for setting an output voltage of each of the power supply circuits 21 to 26. The FPGA 711 controls output of the setting signal from the FPGA 51. The setting signal is a digital signal.

The D/A converter 20 converts the digital setting signal output from the FPGA 51 into an analog setting signal, and then outputs it to each of the power supply circuits 21 to 26.

Each of the power supply circuits 21 to 26 may be configured as a DC/DC converter made using electronic components, such as a FET, an inductor, a resistance, and an electrolytic capacitor. An example of the DC/DC convertor is a switching regulator. Each of the power supply circuits 21 to 26 outputs, to the driver IC 27, the output voltage designated by the setting signal.

The power supply circuit 21 is connected to the driver IC 27 via a trace VDD1. The power supply circuit 22 is connected to the driver IC 27 via a trace VDD2. The power supply circuit 23 is connected to the driver IC 27 via a trace VDD3. The power supply circuit 24 is connected to the driver IC 27 via a trace VDD4. The power supply circuit 25 is connected to the driver IC 27 via a trace VDD5. The power supply circuit 26 is connected to the driver IC 27 via a trace HVDD. The power supply circuit 26 is connected to each driving element 111 via a trace VCOM. The traces HVDD and VCOM are branched from an intermediate portion of a trace that is pulled out from the power supply circuit 26.

The power supply circuits 21 to 26 are respectively connected to waveform generating circuits 30(1) to 30(n) in the driver IC 27 (n is a natural number equal to or greater than 2, for example, n is equal to the number of driving elements 111 in the head unit 11). Details of the driver IC 27 are described below.

Each of the power supply circuits 21 to 25 is a normal power supply circuit, which means a power supply circuit generally used. The power supply circuit 26 is a special power supply circuit. The power supply circuit 26 can be used as a power supply voltage for the VCOM of the driving elements 111, or can be used as a high-side back gate voltage (HVDD) of PMOS transistors 311 to 315 described below.

The driver IC 27 is connected to the FPGA 51 via a control line 40 and n pieces of control line 33(1) to 33(n). The driver IC 27 is connected to n pieces of the driving element 111 via n pieces of signal line 34(1) to 34(n). Each signal line 34 is connected to an individual electrode of the corresponding driving element. The driver IC 27 is connected to a trace GND, which is a ground wire.

In the above example, the control lines 33(1) to 33(n) are arranged in parallel in a position between the FPGA 51 and the driver IC 27. The present disclosure, however, is not limited thereto. For example, one serial signal line may be provided between the FPGA 51 and the driver IC 27. In that configuration, the FPGA 51 may convert a signal transmitted through each of the control lines 33(1) to 33(n) to a serial signal, and the converted serial signal may be output to the driver IC 27 via the above serial signal line. In that case, the driver IC 27 may convert the serial signal into a parallel signal, extract the signal transmitted through each of the control lines 33(1) to 33(n), and input the extracted signal into n pieces of selector and n pieces of the waveform generating circuit. This configuration reduces the number of traces between the FPGA 51 and the driver IC 27 or the number of pins required for the driver IC 27.

The control lines 33(1) to 33(n) are provided corresponding to n pieces of the waveform generating circuit 30(1) to 30(n). The signal for controlling the FET provided for each waveform generating circuit 30 is transmitted through each control line 33. Each waveform generating circuit 30 of the driver IC 27 generates a driving signal for driving each driving element 111 in accordance with the above signal, and the driving signal generated is output to each driving element 111 via the corresponding signal line 34.

A control signal for controlling n pieces of selector 90(1) to 90(n) in the driver IC 27 is transmitted through the control line 40. The FPGA 51 controls the n pieces of the selector 90(1) to 90(n) and selects a power supply circuit for generating the driving signal to be output to each signal line 34.

Figure 4:
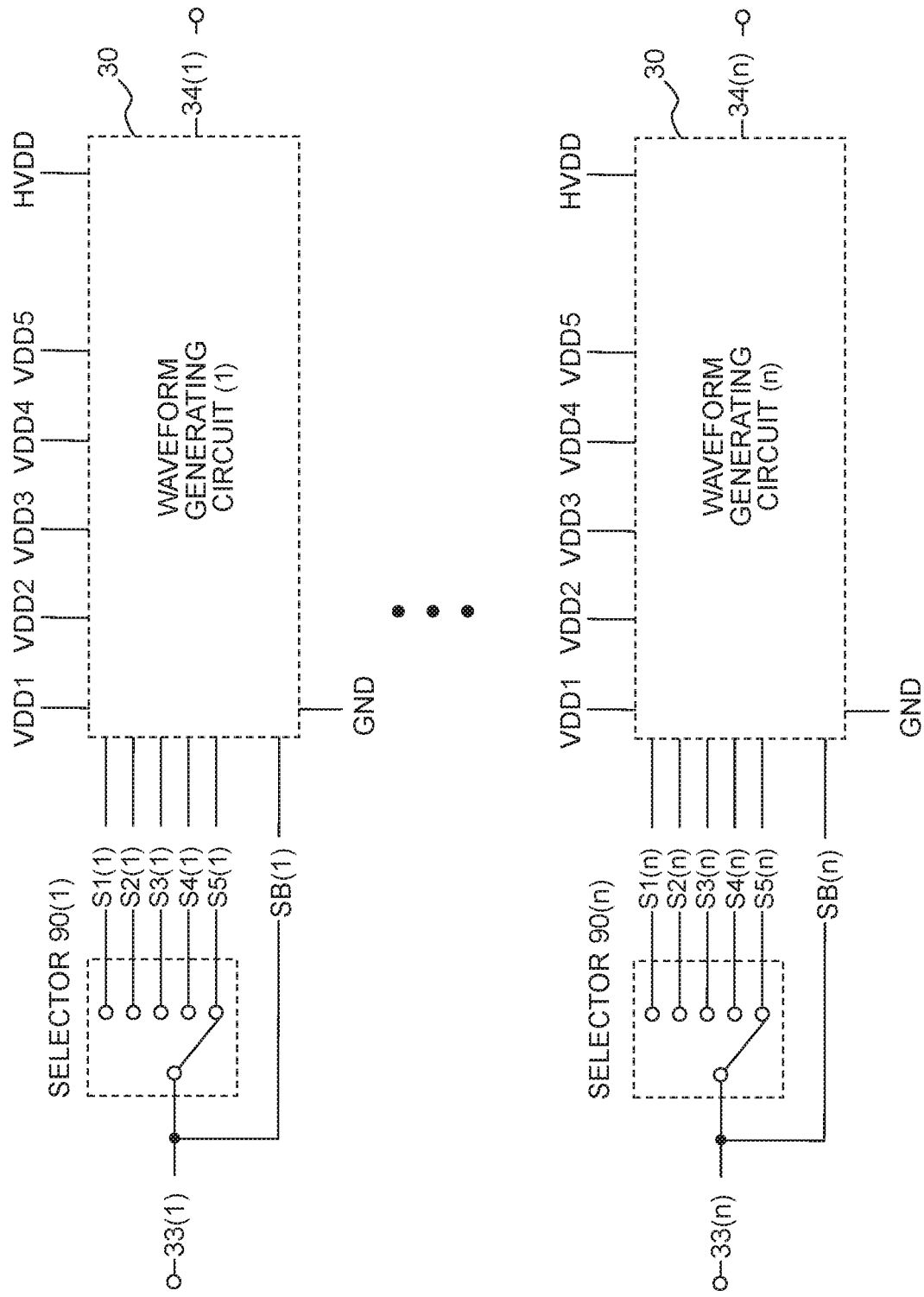
FIG. 4 depicts an exemplary circuit configuration provided for a driver IC.

As depicted in FIG. 4, the driver IC 27 includes n pieces of the waveform generating circuit 30(1) to 30(n), and n pieces of the selector 90(1) to 90(n) provided corresponding to the waveform generating circuits 30(1) to 30(n), respectively. The n pieces of the selector 90(1) to 90(n) are provided corresponding to n pieces of the driving element 111. The selectors 90 are components of hardware that is configured, for example, by transistors in the driver IC 27.

The driver IC 27 includes n pieces of the above configuration, the number of which is the same as the number of nozzles. Thus, the configuration of the circuit disposed between the control line 33(1) and the signal line 34(1) is explained below, as a representative. In the driver IC 27, the selector 90(1) and the waveform generating circuit 30(1) are formed between the control line 33(1) and the signal line 34(1).

The control line 33(1) from the FPGA 51 is connected to the selector 90(1). The control line 33(1) is branched from an intermediate portion of a route connecting the FPGA 51 and the selector 90(1), and a control line SB(1) branched from an intermediate portion of the control line 33(1) is connected to the waveform generating circuit 30(1).

The selector 90(1) is connected to the waveform generating circuit 30(1) via five control lines S1(1), S2(1), S3(1), S4(1), and S5(1). The selector 90(1) selects any one of the five control lines S1(1), S2(1), S3(1), S4(1), and S5(1) in accordance with a command from the FPGA 51, and connects the selected line to the control line 33(1).

The waveform generating circuit 30(1) is connected to five traces connected to the traces VDD 1 to VDD 5, a trace connected to the trace HVDD, and a trace connected to the trace GND.

Figure 5:
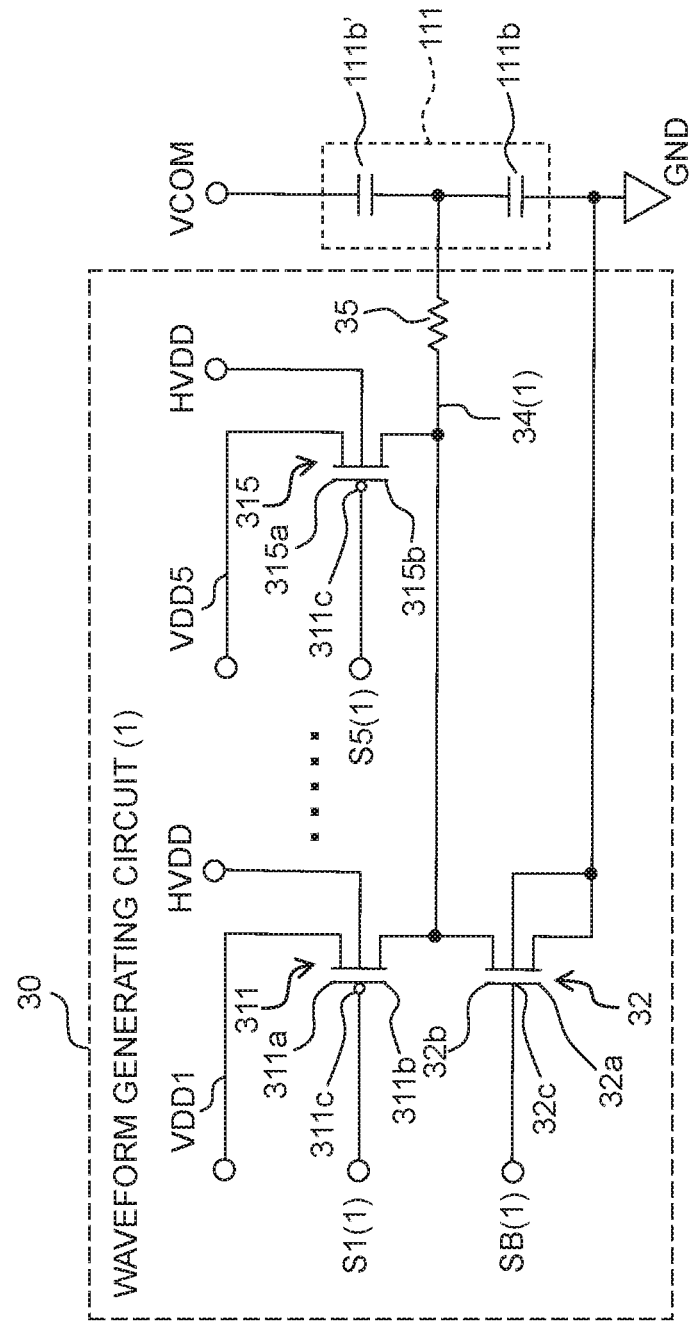
FIG. 5 depicts an exemplary circuit configuration of a waveform generating circuit provided for the head unit.

FIG. 5 depicts an exemplary circuit configuration of the waveform generating circuit 30(1) provided for the head unit 11 according to this embodiment. Since the waveform generating circuits 30(1) to 30(n) have the same configuration, only the waveform generating circuit 30(1) is explained referring to FIG. 5. The waveform generating circuit 30(1) includes five P-type Metal Oxide Semiconductor (PMOS) transistors 311 to 315 (only two transistors are depicted in FIG. 5), a N-type Metal Oxide Semiconductor (NMOS) transistor 32, a resistance 35, and the like. The waveform generating circuit 30(1) is connected to the individual electrode of the driving element 111 via the signal line 34(1).

Each driving element 111 of this embodiment is a piezoelectric element as disclosed in FIG. 5 of Japanese Patent Application Laid-open No. 2015-24531 (Japanese Patent Application No. 2013-154357). Each driving element 111 is the piezoelectric element including a first active portion interposed between the individual electrode and a first constant potential electrode and a second active portion interposed between the individual electrode and a second constant potential electrode. Each driving electrode 111 thus includes a capacitor 111b and a capacitor 111b'.

The signal line 34(1) is connected to five drain terminals 311b to 315b of the five PMOS transistors 311 to 315. A source terminal 32a of the NMOS transistor 32 is connected to ground. Illustration of the PMOS transistors 312 to 314 are omitted in FIG. 5.

The control line S1(1) is connected to a gate terminal 311c of the PMOS transistors 311. The control line S2(1) is connected to a gate terminal 312c of the PMOS transistor 312. The control line S3(1) is connected to a gate terminal 313c of the PMOS transistor 313. The control line S4(1) is connected to a gate terminal 314c of the PMOS transistor 314. The control line S5(1) is connected to a gate terminal 315c of the PMOS transistor 315. The control line SB(1) is connected to a gate terminal 32c of the NMOS transistor 32.

The PMOS transistor 311 is connected to the power supply circuit 21 via the trace VDD1. The PMOS transistor 312 is connected to the power supply circuit 22 via the trace VDD2. The PMOS transistor 313 is connected to the power supply circuit 23 via the trace VDD3. The PMOS transistor 314 is connected to the power supply circuit 24 via the trace VDD4. The PMOS transistor 315 is connected to the power supply circuit 25 via the trace VDDS.

Drain terminals 311b to 315b of the five PMOS transistors 311 to 315 are connected to a first end of the resistance 35. A drain terminal 32b of the NMOS transistor 32 is connected to the first end of the resistance 35. A second end of the resistance 35 is connected to the individual electrode of the driving element 111 (a second end of the capacitor 111b' and a first end of the capacitor 111b). The first constant potential electrode of the driving element 111 (a first end of the capacitor 111b') is connected to the VCOM, and the second constant potential electrode of the driving element 111 (a second end of the capacitor 111b) is connected to ground.

A piezoelectric body that is a portion interposed between the first constant potential electrode and the individual electrode of the driving element 111 is polarized in a direction directed from the first constant potential electrode to the individual electrode. When a voltage higher than that applied to the first constant potential electrode is erroneously applied to the individual electrode, the polarization may vary. In order to solve that problem, in this embodiment, an output voltage of the power supply configured to apply the voltage to the first constant potential electrode is set not to be lower than an output voltage of the power supply configured to apply the VDD voltage to the individual electrode.

When the FPGA 51 outputs a low-level signal (L signal) to the control line 33(1), any one of the PMOS transistors 311 to 315 connected to the signal line selected by the selector 90(1) becomes an on state. The control line 33(1) to which the low-level signal is input corresponds to, for example, the control line S1(1) depicted in FIG. 5. The capacitor 111b is charged with the voltage supplied from any one of the power supply circuits 21 to 25, and the capacitor 111b' is discharged. When the FPGA 51 outputs a high-level signal (H signal) to the control line 33(1), the NMOS transistor 32 becomes an on state. The capacitor 111b' is charged with the voltage output from any one of the power supply circuits 21 to 25, and the capacitor 111b is discharged. The control line 33(1) to which the high-level signal is input corresponds to the control line SB(1) depicted in FIG. 5. The driving element 111 is deformed by alternatingly charging and discharging each of the capacitors 111b and 111b', thus jetting ink from the opening 11a of the corresponding nozzle.

Namely, the driving signal for driving the driving element 111 is output to the control line 34(1). The selector 90(1) selects any one of the five control lines S1(1) to S5(1) as the control line to be connected to the control line 33, which allows any one of the five power supply circuits 21 to 25 to be selected as the power supply circuit for generating the driving signal.

Figure 6:
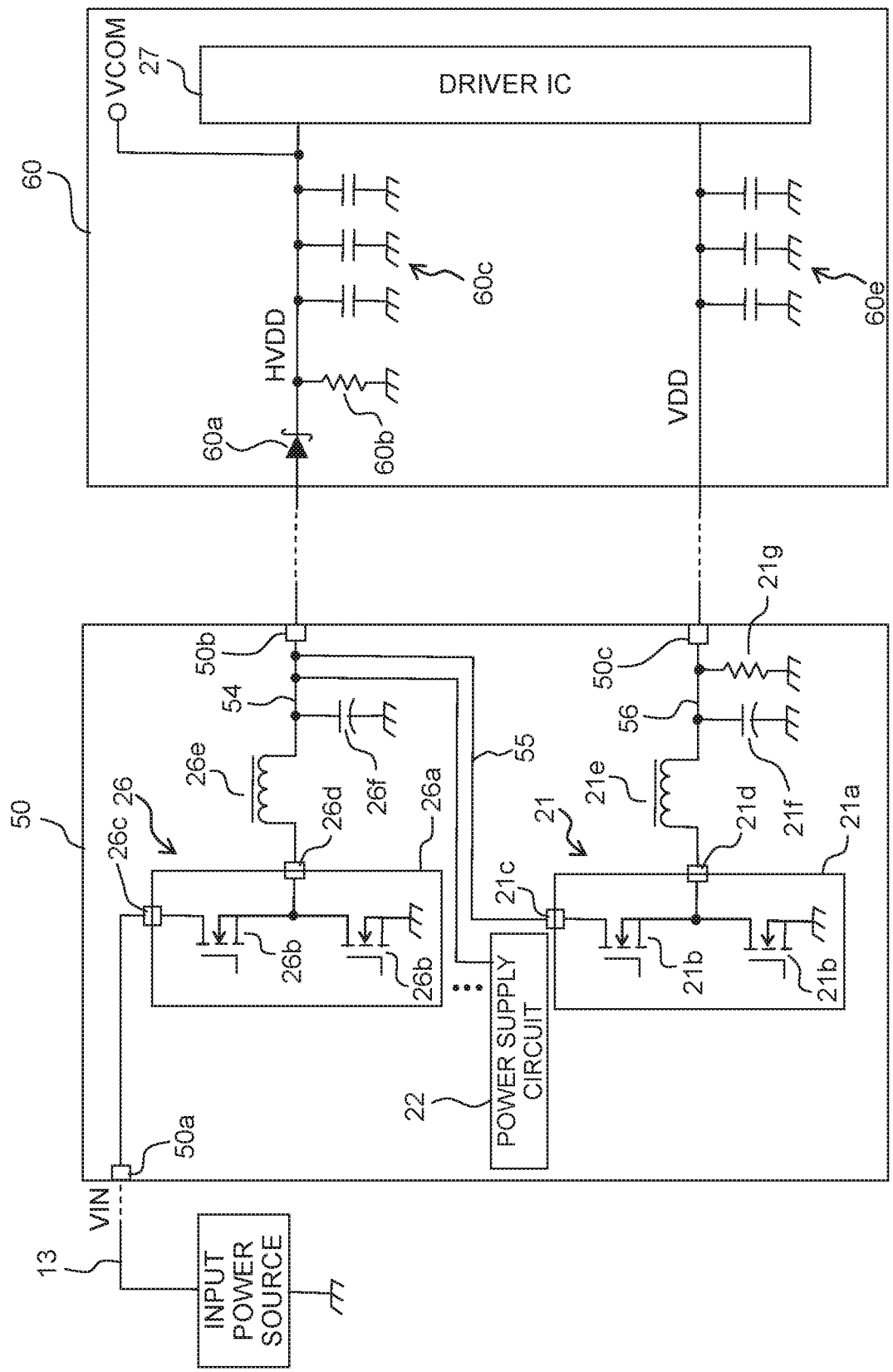
FIG. 6 depicts another exemplary block configuration including the power supply board and the flexible circuit board.

As depicted in FIG. 6, the power circuit 26 includes a power supply IC 26a. The power supply IC 26a includes two FETs 26b, an input terminal 26c, an output terminal 26d, and the like. The output terminal 26d is connected to a first output terminal 50b of the power supply board 50 via a first line 54. In the first line 54, the output terminal 26d, the first output terminal 50b, and a coil 26e are connected to each other in series, and the coil 26e is disposed between the output terminal 26d and the first output terminal 50b. A first end of a capacitor (condenser) 26f is connected to a portion of the first line 54 between the coil 26e and the first output terminal 50b. A second end of the capacitor 26f is connected to ground. The input terminal 26c of the power supply IC 26a is connected to an input power source via an input terminal 50a of the power supply board 50. The input power source is connected to the input terminal 50a of the power supply board 50 via a power supply cable 13. The length of the power supply cable 13 is, for example, 2 to 3 m, which is not less than twice the movable distance of the conveyance unit 12. This configuration results in sufficient degrees of freedom in movement of the ink-jet head 4 and the conveyance unit 12.

The power supply circuit 21 includes a power supply IC 21a. The power supply IC 21a includes two FETs 21b, an input terminal 21c, and an output terminal 21d, and the like. The output terminal 21d is connected to a second output terminal 50c of the power supply board 50 via a second line 56. In the second line 56, the output terminal 21d, the second output terminal 50c, and a coil 21e are connected to each other in series, and the coil 21e is disposed between the output terminal 21d and the second output terminal 50c. A first end of a capacitor (condenser) 21f is connected to a portion of the second line 56 between the coil 21e and the second output terminal 50c. A second end of the capacitor 21f is connected to ground. A first end of a resistance 21g is connected to a portion of the second line 56 between the first end of the capacitor 21f and the second output terminal 50c. A second end of the resistance 21g is connected to the ground.

A branched line 55 is branched from the first line 54 at a portion between the first output terminal 50b and the first end of the capacitor 26f. The branched line 55 is connected to the input terminal 21c of the power supply circuit 21. Namely, the voltage on the output side of the power supply circuit 26 is input to the power supply circuit 21. Similar to the power supply circuit 21, each of the power supply circuits 22 to 25 includes the power supply IC, which includes two FETs, the input terminal, the output terminal, and the like. Similar to the power supply circuit 21, the output terminal of each of the power supply circuits 22 to 25 is connected to the output terminal of the power supply board 50. The capacitor, the resistance, the output terminal of each of the power supply circuits 22 to 25, and the output terminal of the power supply board 50 are connected to each other, and the capacitor and resistance are provided between the output terminal of each of the power supply circuits 22 to 25 and the output terminal of the power supply board 50. The input terminal of each of the power supply circuits 22 to 25 is connected to a portion between the first output terminal 50b and the first end of the capacitor 26f. Namely, the input terminal of the power supply IC of each of the power supply circuits 21 to 25, the first output terminal 50b, and the first end of the capacitor 26f are connected to each other in parallel, and the input terminal of the power supply IC of each of the power supply circuits 21 to 25 is disposed between the first output terminal 50b and the first end of the capacitor 26f. Similar to the power supply circuit 21, the voltage on the output side of the power supply circuit 26 is input to the input terminal of the power supply IC of each of the four power supply circuits 22 to 25. Namely, the input terminal of each of the five power supply circuits 21 to 25 and the first output terminal 50b are connected to the output terminal 26d of the power supply circuit 26 in parallel via the first line 54.

The six power supply circuits 21 to 26 are, for example, switching regulators. The maximum output wattage of the five power supply circuits 21 to 25 is smaller than the output wattage of the power supply circuit 26. The maximum output current of the power supply ICs of the five power supply circuits 21 to 25 is smaller than the maximum output current of the power supply IC 26a of the power supply circuit 26. The withstand voltage of the power supply ICs of the five power supply circuits 21 to 25 may be lower than the withstand voltage of the power supply IC 26a of the power supply circuit 26. Namely, it is possible to use the power supply circuit of which output wattage is small, the power supply IC of which maximum output current is small, and the power supply IC of which withstand voltage is small. The withstand voltage of each FET 21b of the power supply circuit 21, i.e., the withstand voltage of the switching element, may be lower than the withstand voltage of each FET 26b of the power supply circuit 26.

In the following, a relation between the power supply circuit 21 and the flexible circuit board 60 is explained. Explanation about a relation between each of the power supply circuits 22 to 25 having the same configuration as the power supply circuit 21 and the flexible circuit board 60 is omitted. Each of the traces VDD1 to VDD5 is also simply referred to as the trace VDD in some cases.

The flexible circuit board 60 includes a diode 60a, a resistance 60b, and capacitors (condensers) 60c. An input terminal of the diode 60a is connected to the first output terminal 50b of the power supply board 50 via a trace. An output terminal of the diode 60a is connected to the driver IC 27 via the trace HVDD. The trace VCOM branched from the trace HVDD is connected to the first constant potential electrode of the driving element 111 without involving the driver IC. Namely, the power supply circuit 26 is connected to the first constant potential electrode of the driving element 111 via the first output terminal 50b, the diode 60a, and the trace VCOM.

A first end of the resistance 60b is connected to a portion between the output terminal of the diode 60a and the driver IC 27. A second end of the resistance 60b is connected to ground. The first end of the resistance 60b, the driver IC 27, and first ends of the capacitors 60c are connected to each other in parallel. The capacitors 60c are disposed between the first end of the resistance 60b and the driver IC 27. Second ends of the capacitors 60c are connected to ground. The diode 60a and the resistance 60b may be provided on the power supply board 50. A relay board may be provided between the power supply board 50 and the flexible circuit board 60. The relay board may include the diode 60a and the resistance 60b.

The flexible circuit board 60 includes capacitors (condensers) 60e. The second output terminal 50c of the power supply board 50 is connected to the driver IC 27 via the trace VDD. Namely, the power supply circuit 21 is connected to the individual electrode of the driving element 111 via the second output terminal 50c to supply voltage (see FIG. 5). The first ends of the capacitors 60e are connected to a portion between the second output terminal 50c and the driver IC 27, in parallel. The capacitors 60e are disposed between the first end of the resistance 60d and the driver IC 27. Second ends of the capacitors 60e are connected to ground.

Figure 7:
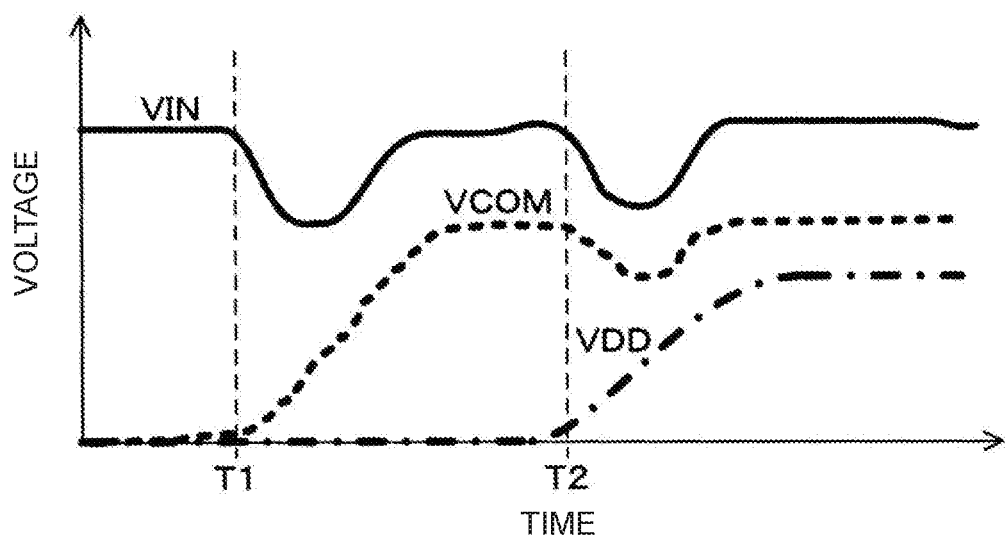
FIG. 7 is a graph indicating a mutual relation between an input voltage VIN to be input to an input terminal and an output voltage VCOM of a first output terminal and an output voltage VDD of a second output terminal when power supply circuits are activated.

FIG. 7 is a graph indicating a mutual relation between the input voltage VIN to be input to the input terminal 50a and the output voltage VCOM of the first output terminal 50b and the output voltage VDD of the second output terminal 50c when power supply circuits 21 and 26 are activated. In FIG. 7, the horizontal axis indicates time and the vertical axis indicates voltage. In FIGS. 7 to 9 and FIGS. 11 and 12, the input voltage VIN is indicated by a solid line, the output voltage VCOM is indicated by a dashed line, and the output voltage VDD is indicated by a dot-dash chain line.

At a time T1 in FIG. 7, a predefined input voltage VIN (>0) is input to the input terminal 50a. Before the time T1, the power supply circuit 26 is not activated and driving thereof is not started. The output voltage VCOM of the first output terminal 50b is substantially zero. At the time T1, the power supply circuit 26 is activated and driving thereof is started. Before a time T2 (>T1), the power supply circuit 21 is not activated and driving thereof is not started. The output voltage VDD of the second output terminal 50c is substantially zero. At the time T2, the power supply circuit 21 is activated and driving thereof is started.

When the power supply circuit 26 is activated at the time T1, the output voltage VCOM of the first output terminal 50b starts to rise. The input voltage VIN instantly falls when the power supply circuit 26 is activated Immediately after the power supply circuit 26 is activated, charge transfers to the capacitors 60c at once. This rapidly increases the load on the input voltage VIN to instantly decrease the input voltage VIN. When the input voltage VIN that is the input power source of the power supply circuit 26 falls, the rising rate of the output voltage VCOM becomes slow. Thus, even when the input voltage VIN instantly falls, the input voltage VIN does not become lower than the output voltage VCOM. The output voltage VCOM rises up to a predefined voltage lower than the input voltage VIN.

When the power supply circuit 21 is activated at the time T2, the output voltage VDD of the second output terminal 50c starts to rise. The output voltage VCOM and the input voltage VIN instantly fall when the output voltage VDD starts to rise. Immediately after the power supply circuit 21 is activated, charge transfers to the capacitors 60c at once. This rapidly increases the load on the output voltage VCOM to instantly decrease the output voltage VCOM. When the output voltage VCOM that is the input power source of the power supply circuit 26 falls, the rising rate of the output voltage VDD becomes slow. Thus, even when the output voltage VCOM instantly falls, the output voltage VCOM does not become lower than the output voltage VDD Immediately after the power supply circuit 21 is activated, the load on the output voltage VCOM rapidly increases. This rapidly increases the load on the input voltage VIN to instantly decrease the input voltage VIN. However, since the output voltage VCOM is also getting lower, the input voltage VIN does not become lower than the output voltage VCOM. This can maintain the relation input voltage VIN>output voltage VCOM>output voltage VDD. Accordingly, backflow of current through the power supply circuit 26 is not caused, thus preventing damage in the FETs 26b of the power supply circuit 26.

After the time T2, the ink-jet head 4 jets ink from each nozzle. Namely, driving of the power supply circuits 26 and 21 is started before the ink-jet head 4 starts the jetting of ink.

Figure 8:
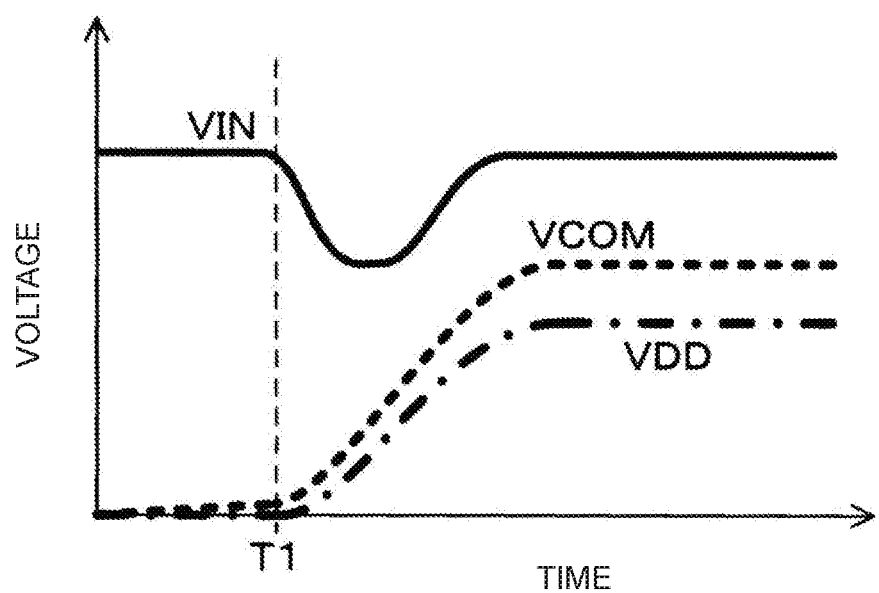
FIG. 8 is a graph indicating a mutual relation between the input voltage VIN to be input to the input terminal and the output voltage VCOM of the first output terminal and the output voltage VDD of the second output terminal when the power supply circuits are activated at the same time.

The power supply circuits 21 and 26 may be activated at the same time. FIG. 8 is a graph indicating a mutual relation between the input voltage VIN to be input to the input terminal 50a and the output voltage VCOM of the first output terminal 50b and the output voltage VDD of the second output terminal 50c when the power supply circuits 21 and 26 are activated at the same time. Unlike the case depicted in FIG. 7, the power supply circuit 21 is activated simultaneously with the power supply circuit 26 at the time T1 in FIG. 8. This can shorten the time until printing is available.

Figure 9:
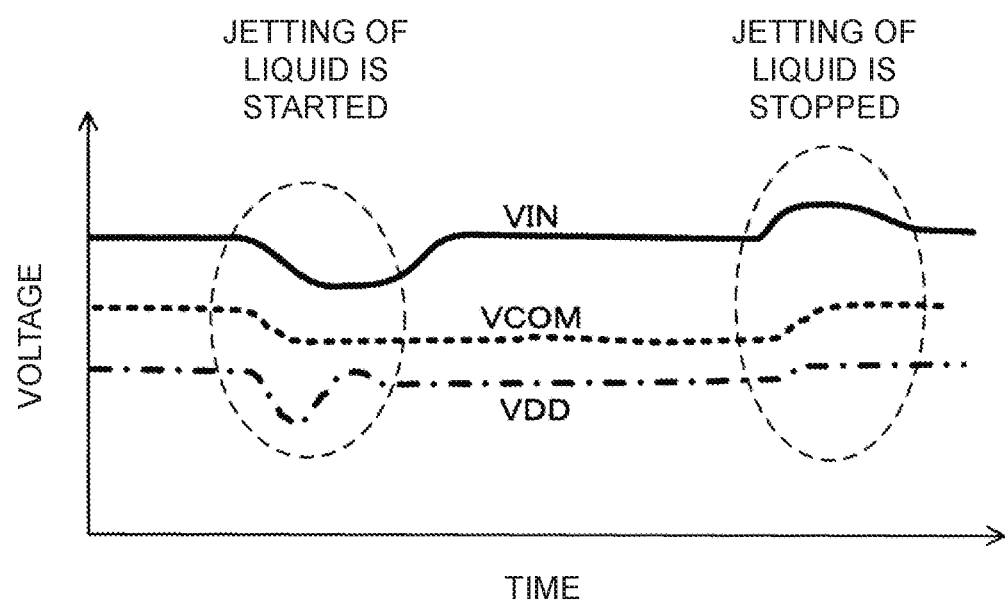
FIG. 9 is a graph indicating a mutual relation between the input voltage VIN to be input to the input terminal and the output voltage VCOM of the first output terminal and the output voltage VDD of the second output terminal when the jetting of liquid is started and when the jetting of liquid is stopped.

FIG. 9 is a graph indicating a mutual relation between the input voltage VIN to be input to the input terminal 50a and the output voltage VCOM of the first output terminal 50b and the output voltage VDD of the second output terminal 50c when the jetting of liquid is started and when the jetting of liquid is stopped. In FIG. 9, the horizontal axis indicates time and the vertical axis indicates voltage. A case in which liquid is jetted by using the power supply circuit 21 is explained. It is assumed that the relation input voltage VIN>output voltage VCOM>output voltage VDD>0 is satisfied in an initial state.

At the start of the jetting of liquid, the output voltage VDD instantly falls. When the output voltage VDD falls, electric power is immediately supplied from the first line 54 to the power supply circuit 21 and the second line 56 via the branched line 55. The first line 54 is disposed close to the second line 56, and the branched line 55 is short. This easily causes a quick response to a load variation due to the jetting of liquid.

Supplying the electric power to the second line 56 immediately increases the output voltage VDD and restores the voltage. Supplying the electric power to the second line 56 decreases the output voltage VCOM. When the output voltage VCOM falls, the electric power is supplied from the input voltage VIN to the first line 54 to maintain the relation output voltage VCOM>output voltage VDD.

Supplying the electric power to the first line 54 decreases the input voltage VIN. The decrease in the input voltage VIN is caused by the decrease in the output voltage VDD. Supplying the electric power to the second line 56 immediately restores the output voltage VDD. Thus, the input voltage VIN falls slowly. Further, the output voltage VCOM falls together with the decrease in the input voltage VIN, the relation input voltage VIN>output voltage VCOM is maintained. Namely, the relation input voltage VIN>output voltage VCOM>output voltage VDD is maintained, which prevents backflow of current through the power supply circuit 26 and consequently prevents damage in the FETs 26b of the power supply circuit 26.

When the jetting of liquid is stopped, the output voltage VDD instantly rises. The increase in the output voltage VDD immediately moves charge to the capacitor 26f via the branched line 55. This makes the increase in the output voltage VDD slow, which makes the increase in the output voltage VCOM and the input voltage VIN slow.

Figure 10:
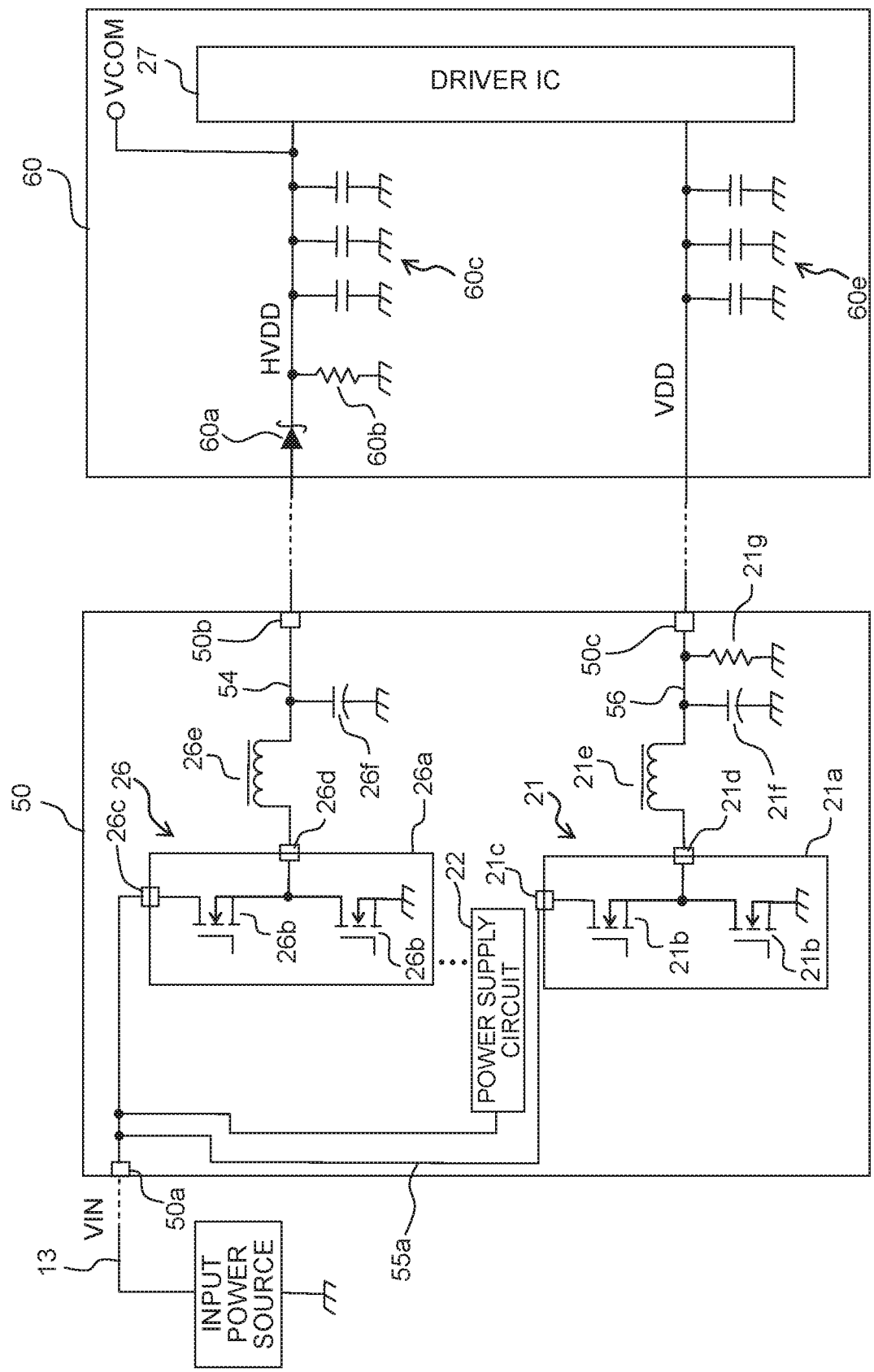
FIG. 10 depicts an exemplary block configuration including the power supply board and the flexible circuit board according a comparative example.

FIG. 10 depicts an exemplary block configuration including the power supply board 50 and the flexible circuit board 60 according a comparative example. The configuration depicted in FIG. 10 according to the comparative example is the same as that depicted in FIG. 6 except that the input terminal 21c of the power supply circuit 21 is connected to the input terminal 50a of the power supply board 50 via a line 55a. Namely, in the comparative example, the input voltage of the input power source is directly input to the input terminal 21c of the power supply circuit 21.

Figure 11:
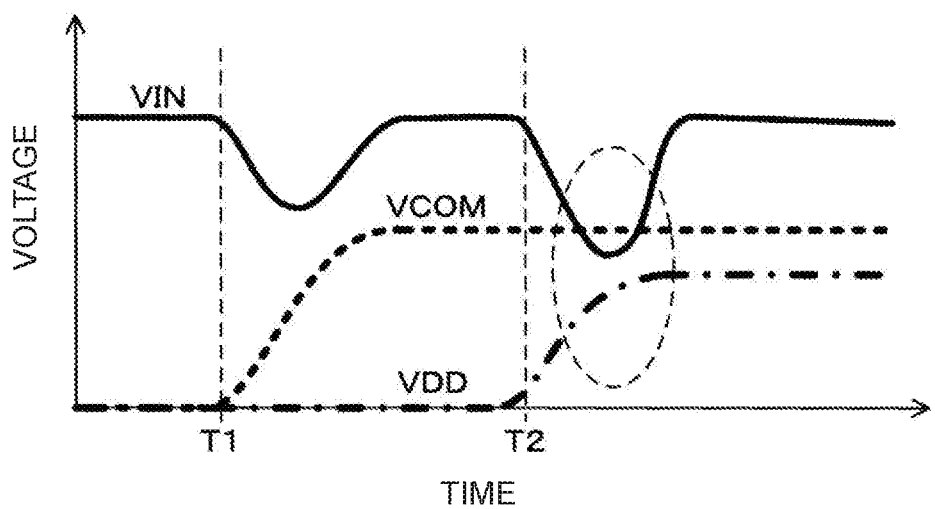
FIG. 11 is a graph indicating a mutual relation between the input voltage VIN to be input to the input terminal and the output voltage VCOM of the first output terminal and the output voltage VDD of the second output terminal when power supply circuits are activated according to the comparative example.

FIG. 11 is a graph indicating a mutual relation between the input voltage VIN to be input to the input terminal 50a and the output voltage VCOM of the first output terminal 50b and the output voltage VDD of the second output terminal 50c when the power supply circuits 21 and 26 are activated according to the comparative example. FIG. 11 has the relation between the input voltage VIN and the output voltage VCOM and the output voltage VDD which is the same as that depicted in FIG. 7, except for the relation between the input voltage VIN and the output voltage VCOM and the output voltage VDD at the time T2. Thus, the relation between the input voltage VIN and the output voltage VCOM and the output voltage VDD at the time T2 is explained below.

When the power supply circuit 21 is activated at the time T2, the output voltage VDD of the second output terminal 50c starts to rise. The output voltage VCOM hardly changes when the output voltage VDD starts to rise. The input voltage VIN instantly falls when the output voltage VDD starts to rise. As described above, since the input voltage of the input power source is directly input to the input terminal 21c of the power supply circuit 21, the input voltage VIN rapidly falls beyond the output voltage VCOM. This causes backflow of current through the power supply circuit 26, thus damaging the FETs 26b of the power supply circuit 26.

Figure 12:
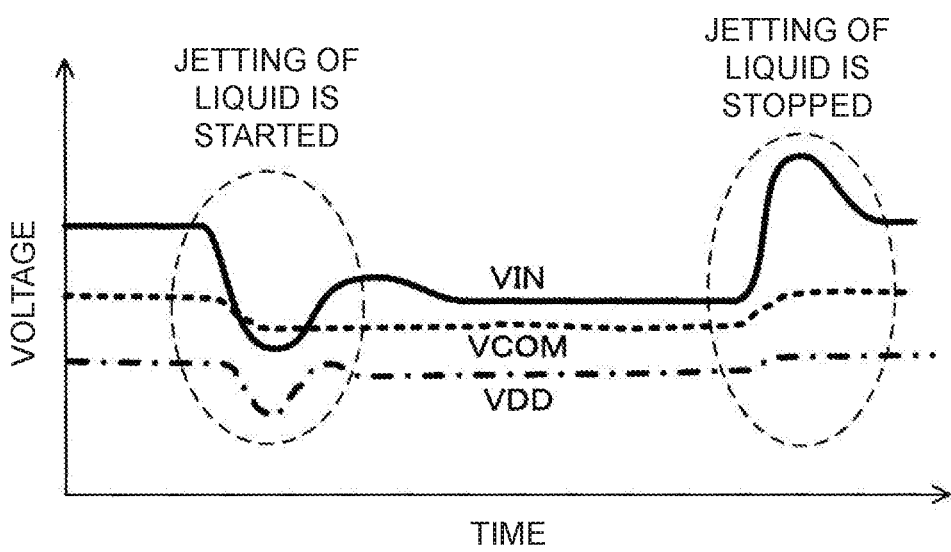
FIG. 12 is a graph indicating a mutual relation between the input voltage VIN to be input to the input terminal and the output voltage VCOM of the first output terminal and the output voltage VDD of the second output terminal when the jetting of liquid is started and when the jetting of liquid is stopped according to the comparative example.

FIG. 12 is a graph indicating a mutual relation between the input voltage VIN to be input to the input terminal 50a and the output voltage VCOM of the first output terminal 50b and the output voltage VDD of the second output terminal 50c when the jetting of liquid is started and when the jetting of liquid is stopped according to the comparative example. It is assumed that the relation input voltage VIN>output voltage VCOM>output voltage VDD>0 is satisfied in an initial state.

At the start of the jetting of liquid, the output voltage VDD instantly falls. When the output voltage VDD falls, the electric power is supplied from the input terminal 50a of the power supply board 50 to the power supply circuit 21 and the second line 56 via the line 55a. As described above, the input power source is connected to the input terminal 50a via the power supply cable 13. The power supply cable 13 has a length of, for example, 2 to 3 m. Since the power supply cable 13 is long, the response is sluggish and the resistance loss is high. In that case, when the electric power is supplied from the input terminal 50a to the power supply circuit 21 and the second line 56, the electric power can not be supplied immediately from the input power source to the input terminal 50a. This rapidly decreases the voltage in the input terminal 50a (i.e., input voltage VIN), which makes the input voltage VIN lower than the output voltage VCOM. In that case, backflow of current through the power supply circuit 26 is caused, thus damaging the FETs 26b of the power supply circuit 26.

When the jetting of liquid is stopped, the output voltage VDD instantly rises. When the output voltage VDD rises, the voltage in the input terminal 50a rapidly rises via the line 55a. In that case, overvoltage is likely to be applied to the input terminal 26c of the power supply circuit 26, which may cause a failure in the FETs 26b of the power supply IC 26a. The printer according to the embodiment of the present disclosure is different in configuration from the comparative example, and thus the printer according to the embodiment of the present disclosure does not suffer from the problems caused in the comparative example.

The embodiment disclosed above is just an example in every respect. The present disclosure is not limited to those. The technical features described in the above embodiment can be combined with each other. The present disclosure is intended to include all modifications and equivalents without departing from the gist and the scope of the claims below.

What is claimed is:

1. A power supply board configured to supply electric power to a head configured to jet liquid, the board comprising:
   a first power supply circuit;

a second power supply circuit configured to output an output voltage that is lower than an output voltage of the first power supply circuit;
a first terminal connected to the head and configured to supply the electric power from the first power supply circuit to the head;
a second terminal connected to the head and configured to supply the electric power from the second power supply circuit to the head;
a first line connected to an output terminal of the first power supply circuit and configured to supply the electric power from the first power supply circuit to the first terminal;
a second line connected to an output terminal of the second power supply circuit and configured to supply the electric power from the second power supply circuit to the second terminal; and
a branched line branched from the first line to be connected to an input terminal of the second power supply circuit and configured to supply the electric power from the first power supply circuit to the second power supply circuit,
wherein an input power source is connected to an input terminal of the first power supply circuit.

2. The power supply board according to claim 1, wherein the head includes an actuator having a first constant potential electrode and a second constant potential electrode to which an electric potential lower than that of the first constant potential electrode is to be applied, and
the first power supply circuit is configured to supply voltage to the first constant potential electrode via the first terminal.

3. The power supply board according to claim 2, wherein the head includes a plurality of individual electrodes which correspond to a plurality of driving elements respectively, and
the second power supply circuit is configured to supply voltage to at least one of the individual electrodes via the second terminal.

4. The power supply board according to claim 1, further comprising a third power supply circuit having an output voltage lower than the output voltage of the first power supply circuit,
wherein an input terminal of the third power supply circuit, the input terminal of the second power supply circuit, and the first terminal are connected to the output terminal of the first power supply circuit in parallel.

5. The power supply board according to claim 4, wherein a maximum output power of the second power supply circuit and a maximum output power of the third power supply circuit are smaller than an output power of the first power supply circuit.

6. The power supply board according to claim 1, wherein the first power supply circuit is a switching regulator and includes a first IC provided with a first switching element of the switching regulator,
the second power supply circuit is another switching regulator and includes a second IC provided with a second switching element of the another switching regulator, and
a maximum output current of the second IC is smaller than a maximum output current of the first IC.

7. The power supply board according to claim 1, wherein the first power supply circuit is a switching regulator including a first switching element,
the second power supply circuit is another switching regulator including a second switching element, and
a withstand voltage of the second switching element is lower than a withstand voltage of the first switching element.

8. The power supply board according to claim 1, wherein the first power supply circuit is a switching regulator and includes a first IC provided with a first switching element of the switching regulator,
the second power supply circuit is another switching regulator and includes a second IC provided with a second switching element of the another switching regulator, and
a withstand voltage of the second IC is lower than a withstand voltage of the first IC.

9. A printer comprising:
the power supply board as defined in claim 1,
a conveyance unit configured to move a head configured to jet liquid, and
a power supply cable connecting the power supply board and an input power source and having a length not less than twice a movable distance of the conveyance unit.

10. The printer according to claim 9, further comprising a controller configured to control the head and the power supply board,
wherein the controller is configured to control the power supply board so that driving of the first power supply circuit and driving of the second power supply circuit start at the same time.

11. The printer according to claim 9, further comprising a controller configured to control the power supply board,
wherein the controller is configured to control the power supply board so that driving of the first power supply circuit and driving of the second power supply circuit start before the head starts jetting of the liquid.

12. The printer according to claim 9, further comprising a controller configured to control the power supply board,
wherein the controller is configured to control the power supply board so that driving of the first power supply circuit and driving of the second power supply circuit start during conveyance of a printing medium.

13. A printer comprising a plurality of power supply boards each of which is defined in claim 1, wherein the plurality of power supply boards are connected to the input power source.

14. The printer according to claim 13, further comprising a plurality of heads configured to jet liquid, wherein each of the heads is connected to one of the power supply boards.

15. A power supply board configured to supply electric power to a head configured to jet liquid, the board comprising:
a first power supply circuit;
a plurality of second power supply circuits each having an output voltage lower than an output voltage of the first power supply circuit;
a first terminal connected to the head and configured to supply the electric power from the first power supply circuit to the head; and
a plurality of second terminals connected to the head and configured to supply the electric power from the second power supply circuit to the head,
wherein an input power source is connected to an input terminal of the first power supply circuit, and
input terminals of the second power supply circuits and the first terminal are connected to an output terminal of the first power supply circuit in parallel.

* * * * *